Aug. 11, 1931.    G. A. WILLIS    1,818,516
HORSE OR TRESTLE
Filed Feb. 20, 1930    2 Sheets-Sheet 1

Inventor
G. A. Willis
By Watson E. Coleman
Attorney

Aug. 11, 1931.  G. A WILLIS  1,818,516
HORSE OR TRESTLE
Filed Feb. 20, 1930  2 Sheets-Sheet 2
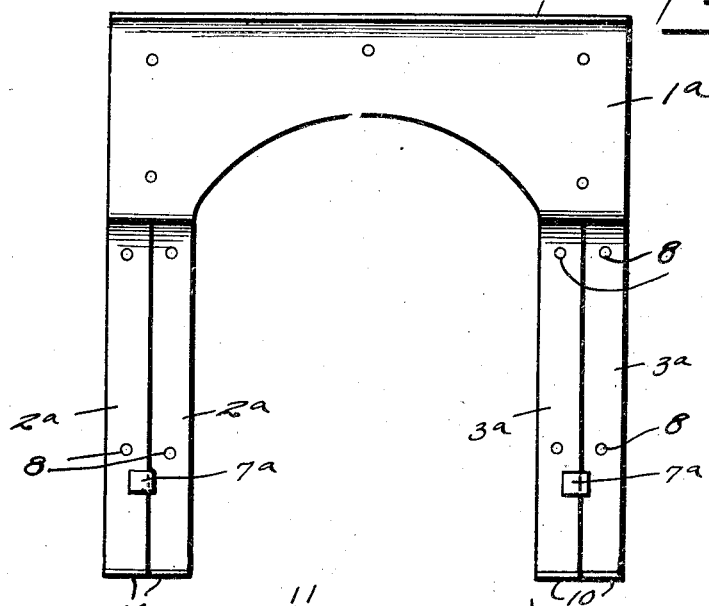
Fig-4-
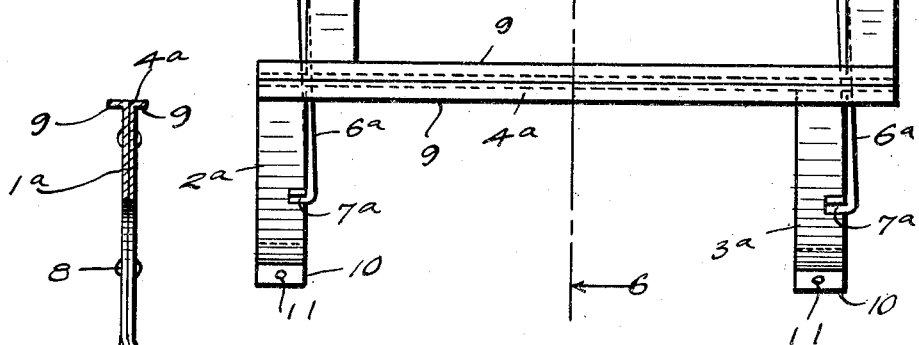
Fig-5-
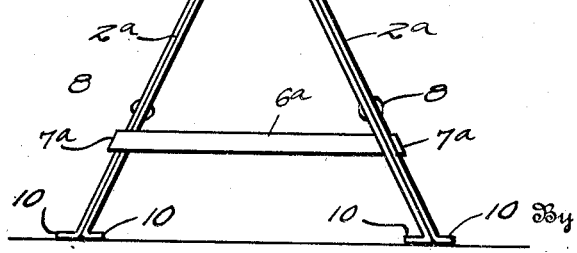
Fig-6-
Inventor
G. A. Willis
By Watson E. Coleman
Attorney Patented Aug. 11, 1931

1,818,516

UNITED STATES PATENT OFFICE

GAIL A. WILLIS, OF RAWLINS, WYOMING

HORSE OR TRESTLE

Application filed February 20, 1930. Serial No. 430,037.

This invention relates to a horse or trestle and has for one of its objects to provide a device of this character which shall be of such light weight as to permit it to be carried from place to place and adjusted to the required position beneath a load with the expenditure of but comparatively little energy and which shall possess such strength as to enable it to be used in garages and other places where heavy loads are to be supported.

The invention has for a further object to provide a horse or trestle of the character stated which shall be so constructed as to enable several samples thereof to be closely nested for shipping or storage purposes.

The invention has for a still further object to provide a horse or trestle of the character stated which shall be simple and capable of being manufactured and sold at comparatively low cost.

With the foregoing and other objects in view, the nature of which will appear as the description proceeds, the invention consists in the construction, combination and arrangement of parts hereinafter fully described and claimed, and illustrated in the accompanying drawings, wherein:—

Figure 4 is a view in side elevation of a slightly modified form of the horse or trestle;

Figure 5 is a top plan view of the modified form of the horse or trestle, and

Figure 6 is a sectional view taken on the vertical plane indicated by the line 6—6 of Figure 5.

Figure 1:
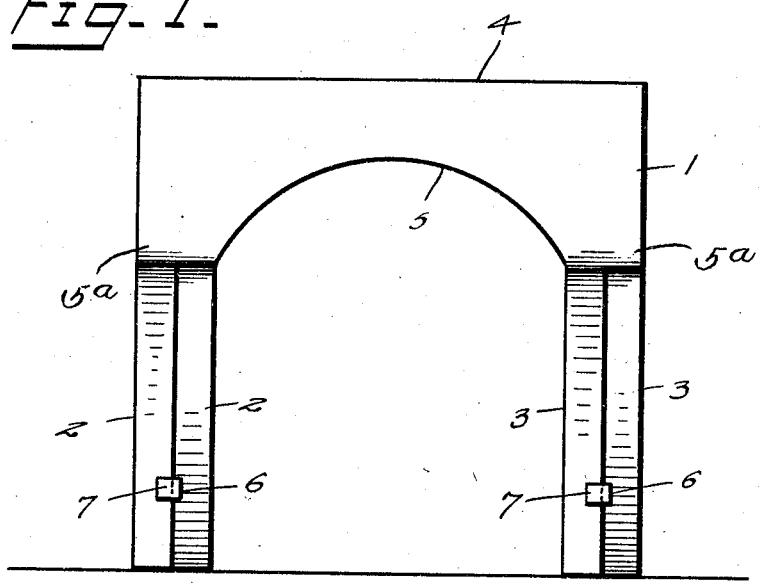
Figure 1 is a view in side elevation of the horse or trestle.
Figure 2:
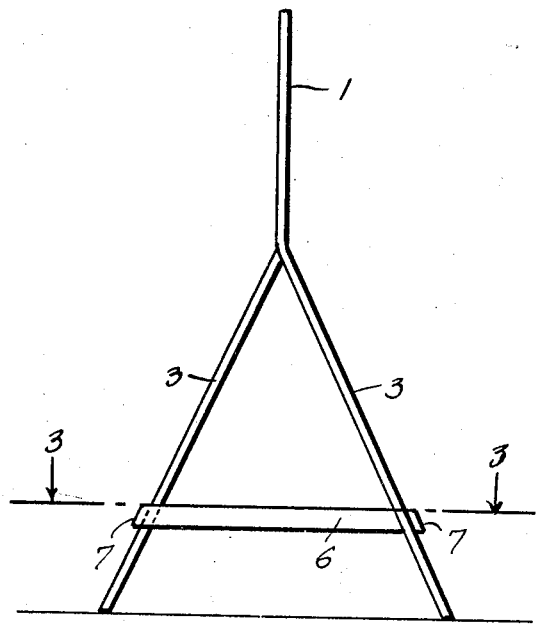
Figure 2 is a view in end elevation of the horse or trestle.
Figure 3:
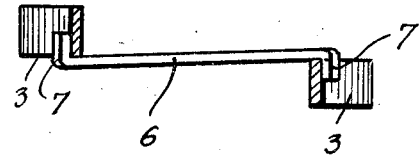
Figure 3 is a sectional view taken on the horizontal plane indicated by the line 3—3 of Figure 2.

The horse or trestle, which is made from sheet metal, comprises a beam or bar 1, a pair of divergent legs 2 and a pair of divergent legs 3. The beam or bar 1 has a straight upper or load supporting edge 4, a concave lower edge 5, and downwardly extended end portions $5^a$. The legs 2 and 3 are formed integrally with the downwardly extended end portions $5^a$ of the beam or bar 1 and the legs of each pair are arranged in downwardly divergent relation and are maintained in such relation by braces 6. The brace 6 of each pair of the legs 2 and 3 is rigid or non-folding and is arranged between the legs and contacts with the inner edges thereof. The braces 6 are provided with angular end portions 7 which contact with the outer sides of the legs 2 and 3 and may be welded or riveted thereto. The bar or beam 1 and its downwardly extended end portions $5^a$ are situated in a common vertical plane, and the legs 3 extend downwardly in opposite directions from the vertical faces or sides of the beam or bar and extensions.

The bar or beam 1 and the legs 2 and 3 are struck up from a single sheet of metal, and are rigid enough to prevent them from bending under heavy loads. The horse or trestle is especially adapted to be used in garages as a support for automobiles and the like.

If desired, the horse or trestle may be provided with a wide upper or load supporting edge and with feet, as shown in Figures 4 to 6. In this form of the invention, the beam or bar $1^a$ and the legs $2^a$ and $3^a$ are of laminated construction, and the layers thereof are secured in assembled relation by rivets 8. The upper edges of the layers of the beam or bar $1^a$ are flanged outwardly, as at 9, to provide the beam or bar with a wide upper or load supporting edge $4^a$. The lower ends of the layers of the legs $2^a$ and $3^a$ are flanged in opposite directions, to provide feet 10 which rest upon the floor or ground and are provided with openings 11 for the reception of bolts or the like in order to permit the horse or trestle to be anchored to the floor or ground. The braces $6^a$ have angular ends $7^a$ which may be riveted or welded to the legs $2^a$ and $3^a$. The flanges 9, in addition to providing a broad load supporting edge, permit boards or other suitable material to be clamped thereto when it is desired to make a work bench, it being understood that when a work bench is to be made, two or more horses or trestles will be used. The legs 2ᵃ and 3ᵃ are provided at their lower ends with the oppositely directed flanges 10 in order to prevent them from cutting into the floor or ground, and in order to permit the horse or trestle to be fastened to the floor or ground. The flanges 9 and 10 may, if desired, be provided by riveting angle irons to the beam or bar 1ᵃ and to the legs 2ᵃ and 3ᵃ of the horse or trestle.

It should be apparent from the foregoing description, taken in connections with the accompanying drawings, that the horses or trestles are simple, durable and capable of being manufactured and sold at comparatively low cost, and that while they are comparatively light in weight, they possess the strength and rigidity necessary to permit them to be used for supporting heavy loads.

While I have described the principle of the invention, together with the device which I now consider the preferred embodiment thereof, it is to be understood that the device shown is merely illustrative and that such changes may be made, when desired, as fall within the scope of the invention as claimed.

I claim:—

1. A horse or trestle, comprising a laminated sheet metal beam, laminated sheet metal legs formed integrally with the ends of the beam, the upper edges of the beam layers being flanged outwardly in opposite directions to provide a broad flat load supporting surface and the lower ends of the layers of the legs being flanged outwardly in opposite directions to provide feet, the legs being arranged in pairs and the legs of each pair being arranged in downwardly divergent relation, and a brace for the legs of each pair.

2. A horse or trestle, comprising a laminated sheet metal beam having downwardly extended end portions, laminated sheet metal legs formed integrally with said end portions, the upper edges of the beam layers being flanged outwardly in opposite directions to provide a broad flat load supporting surface and the lower ends of the layers of the legs being flanged outwardly in opposite directions to provide feet, the legs being arranged in pairs and the legs of each pair being arranged in downwardly divergent relation, and a brace for the legs of each pair.

3. A horse or trestle, comprising a sheet metal beam having downwardly extended end portions formed integrally therewith, the beam and extensions being located in a common vertical plane, a pair of sheet metal legs formed integrally with each of said end portions and extending downwardly from said portions in opposite directions from the lateral sides of said portions and the beams, and a rigid brace terminally secured to the legs of each pair.

4. A horse or trestle, comprising a sheet metal beam having downwardly extended end portions formed integrally therewith, the beam and extensions being located in a common vertical plane, a pair of sheet metal legs formed integrally with each of said end portions and extending downwardly from said portions in opposite directions from the lateral sides of said portions and the beams, and a rigid brace arranged between the legs of each pair and contacting with the inner edges thereof, the braces being provided with angular end portions contacting with and secured to the outer sides of the legs.

In testimony whereof I hereunto affix my signature.

GAIL A. WILLIS.